US005825865A

United States Patent [19]

Oberlander et al.

[11] Patent Number: 5,825,865
[45] Date of Patent: Oct. 20, 1998

[54] TEMPORARY MESSAGE ROUTING AND DESTINATION SELECTION

[75] Inventors: Lewis B. Oberlander, Buffalo Grove; David E. Morgan, Lisle, both of Ill.

[73] Assignee: Motorola, Inc., Schaumburg, Ill.

[21] Appl. No.: 771,685

[22] Filed: Oct. 4, 1991

[51] Int. Cl.⁶ .................................................. H04M 3/54
[52] U.S. Cl. ............................................................ 379/211
[58] Field of Search .................................... 395/600, 650, 395/700, 425, 725, 200; 379/201, 210, 211, 212

[56] References Cited

U.S. PATENT DOCUMENTS

| | | | |
|---|---|---|---|
| 4,313,035 | 1/1982 | Jordan et al. | 179/18 BE |
| 4,475,009 | 10/1984 | Rais et al. | 179/2 A |
| 4,635,189 | 1/1987 | Kendall | 364/200 |
| 4,723,273 | 2/1988 | Diesel et al. | 379/211 |
| 4,740,788 | 4/1988 | Konneker | 340/825.44 |
| 4,752,951 | 6/1988 | Konneker | 379/211 |
| 4,757,267 | 7/1988 | Riskin | 379/113 |
| 4,782,519 | 11/1988 | Patel et al. | 379/221 |
| 4,807,279 | 2/1989 | McClure et al. | 379/211 |
| 4,814,763 | 3/1989 | Nelson et al. | 340/825.44 |
| 4,876,707 | 10/1989 | Hashimoto | 379/57 |
| 4,878,243 | 10/1989 | Hashimoto | 379/211 |
| 4,926,495 | 5/1990 | Comroe et al. | 455/54 |
| 4,951,044 | 8/1990 | Nelson et al. | 340/825.44 |
| 4,956,861 | 9/1990 | Kondo | 379/142 |
| 4,961,216 | 10/1990 | Baehr et al. | 379/57 |
| 5,008,930 | 4/1991 | Gawrys et al. | 379/210 |
| 5,027,384 | 6/1991 | Morganstein | 379/67 |
| 5,027,391 | 6/1991 | O'Neill et al. | 379/373 |
| 5,043,881 | 8/1991 | Hamazaki | 364/200 |
| 5,077,554 | 12/1991 | Orita et al. | 340/825.02 |
| 5,099,509 | 3/1992 | Morganstein et al. | 379/84 |
| 5,199,062 | 3/1993 | Von Meister et al. | 379/67 |

*Primary Examiner*—Wayne Amsbury
*Assistant Examiner*—Jack M. Choules
*Attorney, Agent, or Firm*—Steven G. Parmelee

[57] ABSTRACT

A profile is maintained, either in a central profile data base (106) or in a more distributed manner that includes local profile data bases (706). These profile data bases include preference information for particular users, which preference information is utilized by the system to direct various messages from various sources to various destinations for a particular user. By accessing the system through an appropriate input source (708), the user can provide temporary over-ride instructions that cause this preference information to be temporarily altered. When so altered, messages that would ordinarily be directed to a location in accordance with the original entries to the profile data base will be directed instead to a temporary destination (707) as identified by the user. This temporary destination can either be identified in particular at the time of entering the temporary over-ride instruction, or can be pre-identified in an over-ride plan (709). The over-ride instruction will be removed and the original conditions reset upon occurrence of a predetermined event. This predetermined event can be, for example, occurrence of a pre-established expiration time and/or reception of a reset instruction subsequent to reception of the temporary over-ride instruction.

20 Claims, 5 Drawing Sheets

TEMPORARY MESSAGE ROUTING AND DESTINATION SELECTION

FIELD OF THE INVENTION

This invention relates generally to communication networks, including but not limited to message routing methodology.

BACKGROUND OF THE INVENTION

Communication networks are known. In many such networks, message sources and destinations are selectively coupled to one another through appropriate switches. The switches ordinarily effectuate message routing by referring to a destination address provided by the message originator. For example, to establish a telephonic connection, the originator must enter a telephone number which comprises a destination address. With the destination so preidentified, the network appropriately switches the source and destination into a coupled mode.

Present communication capabilities greatly exceed the capabilities of prior telegraphic and simple telephonic networks. Today's systems accommodate a wide variety of message sources and destination platforms. For example, today's systems accommodate audio information (either in an analog or digital format), facsimile and other image information, binary information (as used to support computer communications), and other kinds of textual messages, to name a few. To accommodate these many kinds of message types, many users have multiple reception platforms, such as landline telephones, cellular telephones, pagers, fax machines, computer modems, and so forth.

Usually, each reception platform will have a different system address, such as a different telephone number. Such a configuration currently offers a high level of convenience and reliability. In the alternative, when a given reception address allows access to more than one kind of reception platform, the message must be directed by the user upon reception. For example, if upon answering a telephone ring the user hears an audible data stream, the user can presume that an incoming facsimile message is present, and the user can then redirect the call to a local fax machine. Though mechanisms are available to automate, at least to some extent, such message routing upon reception, these platforms allow only for limited routing possibilities, and furthermore are only implementable upon reception of a message at a particular address.

A number of problems are associated with the above. As the number of reception platforms increases, so too increases the number of reception addresses. This increasing proliferation of addresses is making more difficult the task of sending a message to an intended recipient. For example, an originator may inadvertently direct a facsimile transmission to an ordinary voice reception telephonic destination, or an important business call may be inadvertently directed to a home telephone number during business hours, as versus an office number. Many other similar examples abound, and will only increase as yet additional communication platforms and services are introduced. Such misdirected communications are particularly troublesome, as users are becoming more accustomed to expecting not only accurate, but timely routing of their messages.

All of the above problems are significantly worsened by yet another trend; the increasing mobility of communication system users. For both business and personal reasons, many users of such communication systems are conducting their affairs while on the move. As a consequence, in addition to all of the above reception platforms that may ordinarily be associated with a particular user, yet other reception devices, in temporary proximity to a user on the move, may, under certain circumstances, be considered as available for use in contacting the user on the move, but which are, presently, unavailable for such use. This unavailability stems primarily from the fact that the communication system is unaware and unable to forward and/or direct incoming communications to such a reception device that is temporarily proximal to the user.

Accordingly, a need exists for a way to accommodate a wide variety of communication platforms while imposing only a minimal burden on originating parties and receiving parties, to allow the receiving parties to better control reception of their incoming messages to best suit their own particular needs, and particularly their mobility.

SUMMARY OF THE INVENTION

These needs and others are substantially met through provision of the method disclosed herein. The method functions in conduction with a communication system that supports an information profile for at least one user. This information profile includes at least some user preferences regarding a plurality of different user destinations, such that the communication system will automatically select a destination from amongst a plurality of candidate destinations for a message intended for the user as a function, at least in part, of the information profile. The method itself provides for accessing this communication system, and providing a temporary over-ride instruction to the communication system to temporarily over-ride at least one element in the information profile.

In one embodiment of the invention, this temporary over-ride instruction constitutes a revision to a user's ordinary destination preferences, thereby allowing the user to temporarily have at least certain messages directed to him or her at a temporary destination, such as another individual's vehicle, home, office, and the like.

In one embodiment of the invention, the temporary over-ride instruction includes an expiration time. The system utilizes the expiration time to automatically reset the information profile and remove the temporary over-ride element.

In another embodiment of the invention, the temporary over-ride instruction includes a commencement time. The communication system utilizes this information to determine when the temporary over-ride element becomes effective.

In yet another embodiment, the temporary over-ride instruction constitutes an instruction that implements a particular previously stored temporary over-ride plan. By previously storing one or more temporary over-ride elements in the system, and by arranging for substitution of those temporary elements in response to a simple temporary over-ride instruction (as versus an instruction that includes all required information, including destination address information for the temporary destination), user input requirements at the time of implementing an over-ride instruction are minimized.

In one embodiment of the invention, upon receiving the temporary over-ride instruction, the system temporarily replaces at least one element in the information profile with at least one temporary element. This temporary element is then used when selecting destinations, which destination selection decisions would previously been made using the replaced element. Upon occurrence of a predetermined event, the system automatically resets, and replaces the temporary element with the previously replaced element.

In one embodiment of the invention, the predetermined event comprises an expiration time as previously specified by the user.

In another embodiment of the invention, the predetermined event constitutes a specific reset instruction as provided by the user subsequent to providing the temporary over-ride instruction.

DESCRIPTION OF A PREFERRED EMBODIMENT

Figure 1:
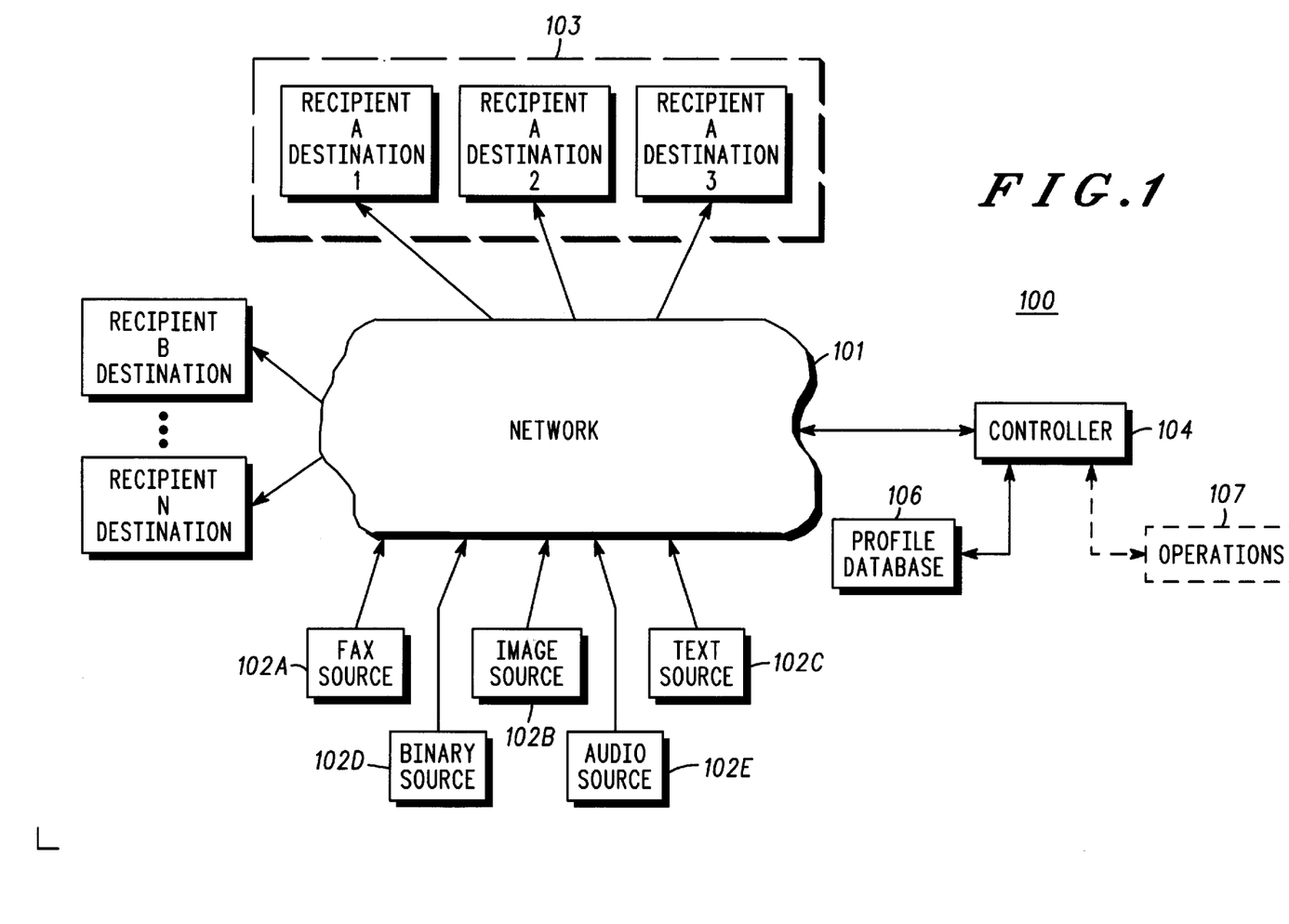
FIG. 1 comprises a block diagram depiction of a communication system in accordance with the invention.

A communication system (100) (FIG. 1) includes a switching network (101) in accordance with well understood prior art technique. The network (101) switches and routes messages from a variety of message sources (102A–E) to a variety of destinations. As an illustrative example, depicted are a facsimile source (102A), an image source (102B), a text source (102C), a binary source (102D), and an audio source (102E). Also depicted in FIG. 1 are A–N recipient destinations. In particular, and illustrative of the need for the invention, recipient A has three discrete addressable destinations 1–3 (103). One such destination could be, for example, a landline telephone, with another destination being a cellular telephone and the remaining destination being a facsimile terminal. Other combinations are of course possible, as are a significantly larger number of associated destinations.

When one of the sources (102) seeks to transmit a message to recipient A, the network (101) will be able to route that message to a most preferred destination (in this example, one of destinations 1, 2, or 3). To facilitate this, the network (101) interfaces with a controller (104), the latter comprising an appropriate data processing and communications capable platform, such as a computer having an operating speed and memory capacity suitable to meet the needs of a particular application. The controller (104) in turn couples to a profile data base (106) wherein destination preferences for various recipients are maintained. (In this particular embodiment, these records are compiled and stored in an initial data gathering activity, such as when a recipient first joins the system (100). The teachings contained herein are likewise applicable, however, to a system that would allow recipient (or system manager) originated initial information, alterations, and/or additions to the profile data base (106) to be made in a dynamic and ongoing manner.)

In one embodiment, the system (100) will also support exercising various operations with respect to a message to be routed. To accommodate this, the controller (104) also couples to an appropriate operations instruction base or platform (107), depending upon the needs of a particular application. For example, if, in order to accommodate routing of a message to a particular preferred destination, the message must first be subjected to a format change, the operations platform (107) would facilitate such a change in format, either by providing the format translation information to the controller (104) or by effectuating the transformation within itself (107).

Figure 2:
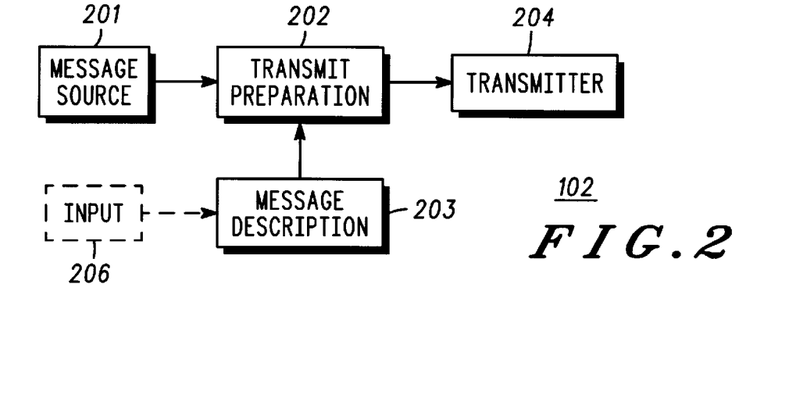
FIG. 2 comprises a block diagram depiction of a message source in accordance with the invention.

With reference to FIG. 2, a typical source (102) as used in the above system includes a message source (201) that sources the user's message itself (as noted above, these messages can assume any of a variety of types and/or substantive content). The message source (201) couples to a transmit preparation unit (202) that prepares the message for transmission. To accommodate some systems, such preparation may include modulation of a carrier frequency. This unit then couples to a transmitter (204) that transmits the message, using an appropriate transmission medium such as a landline or radio frequency channel, all of the above being in accordance with well understood prior art technique.

Pursuant to this embodiment, the source (102) also includes a message descriptor unit (203) that couples to the transmit preparation unit (202). The message descriptor unit (203) prepares a message descriptor for inclusion with the message. In this embodiment, the message descriptor comprises a data header that precedes transmission of the message itself. In other embodiments, the message descriptor could be interleaved with the message information, or can even include, at least in part, the contents of the message itself, such as a title or subject matter field.

If desired, an input unit (206) can also be optionally provided to allow a user to at least partially configure and determine the message descriptor. This input (206) could comprise, for example, a keyboard that would allow a user to specify at least certain aspects of the message descriptor. In other embodiments, the message descriptor would be automatically structured using predetermined or otherwise automatically determined information.

Figure 3:
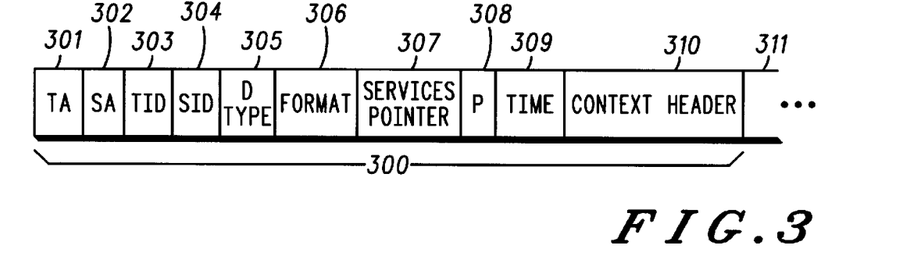
FIG. 3 comprises a diagram depicting an exemplary message descriptor in accordance with the invention.

So configured, the source (102) will transmit a message in combination with a message descriptor. Referring now to FIG. 3, the message descriptor (300) includes many information fields. In this particular embodiment, these fields include a target address (TA) (301) (representing a physical address, such as a telephone number, of a particular recipient destination), a source address (SA) (302) (this being the physical address for the source itself), a target logical ID (TID) (303) (this being a logical ID, such as a personal identification number, that identifies a particular recipient, as versus a particular recipient destination; this information will not always be known, and often this particular field may include a null indicator), a source logical ID (SID) (304) (the source counterpart to the target logical ID), a data type indicator (D TYPE) (305) (to identify the particular kind of message being sent, such as an analog voice message, a voice message that has been vocoded in accordance with a particular vocoding algorithm and method, a facsimile transmission, and so forth), and a format indicator (306) (to identify a particular data format as corresponds to the appended message). The message descriptor (300) further includes a services pointer (307) (to indicate one or more value-added operations to be performed prior to delivery of the message to the recipient; for example, storing and later forwarding the message, converting the message from one format to another, using the message itself as input to the user's profile, defining an action item for subsequent messages, and so forth), a priority indicator (P) (308) (to indicate a particular user defined or automatically attributed priority level to categorize either the importance of the message and/or the sender), a time indicia (309) (to indicate, for example, desired reception time or a deadline by when transmission must be accomplished), and a context header (310) (to include user specified context information pertaining to the message, such as "emergency" or "your loan application").

The message (311) then follows the message descriptor (300). Other categories of information could of course be included in the message descriptor to accommodate the needs of a particular application.

Figure 4:
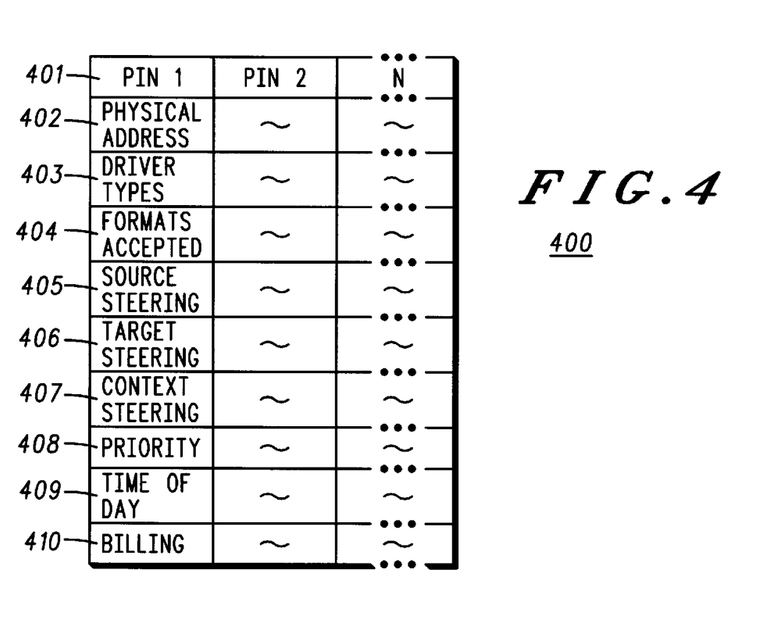
FIG. 4 comprises a tabular depiction of an exemplary information profile in accordance with the invention.

The profile information stored in the profile data base (106) as described above with respect to FIG. 1 is generally depicted in FIG. 4 by reference numeral 400. In this embodiment, each recipient, which recipient may have a plurality of potential message destinations associated therewith, has a corresponding identifying personal identification number (401). For example, one recipient may have personal identification number 1 associated therewith. The information profile next includes the physical addresses (402) associated with that particular recipient. For example, a particular user might have 9 different physical addresses associated with 9 different message destinations, as follows:

(Physical address)

Address 1: (555) 576-1302 (office telephone)
Address 2: (555) 332-9222 (residential telephone)
Address 3: (555) 112-1234 (automobile telephone)
Address 4: (555) 621-3339 (pager)
Address 5: (555) 576-3333 (office FAX)
Address 6: (555) 332-9223 (residential FAX)
Address 7: (555) 576-3334 (office computer modem)
Address 8: (555) 332-9224 (residential computer modem)
Address 9: (555) 332-9225 (answering service)

Next, the information profile (400) includes a driver types (403) entry to identify the types of reception platforms associated with each address. Continuing with the above example, these entries might appear as follows:

(Device types)

Address 1: Telephone
Address 2: Telephone
Address 3: Cellular telephone
Address 4: Pager terminal
Address 5: FAX
Address 6: FAX
Address 7: Modem
Address 8: Modem
Address 9: Telephone Next, the kinds of data formats accepted at each address are specified (404), and given the above example, might appear as follows:
Address 1: ISDN(B1) circuit switched voice
  ISDN (B2) circuit switched data and video
  ISDN (D) packet switched data
Address 2: analog voice
Address 3: analog (or U.S.D.C.) cellular voice and fax (G3)
Address 4: Pager with ASCII message (24 characters)
Address 5: FAX (G2, G3, G4)
Address 6: FAX (G2, G3)
Address 7: ISDN (B1) circuit switched data with V.120 TA
  ISDN (B2) circuit switched data with OSI or DECnet
  ISDN (D) packet switched data with X.400 E-Mail
Address 8: analog voice
Address 9: analog voice Next, recipient specified source steering information (405) is maintained. For example, in the present example, the following information might appear:

(Source steering)

Address 1: All except (555) 321-9211; PIN-778654; PIN-690445
Address 2: (555) 112-1234; (555) 332-9222; PIN-332889 . . . only
Address 3: (555) 332-9222; PIN-332889 . . . only
Address 9: All/default Given this example, all messages are accepted at address 1 (the recipients office telephone) with the exception of a particular specified source address (telephone number 555-321-9211) and 2 particular message sources as identified by their logical personal identification numbers. In effect, the recipient has stipulated that he will accept all messages at his office telephone with the exception of messages that are sourced from a particular physical address and messages that are sourced by two particular individuals or entities. At physical address 2 (the recipient's residential telephone), however, the recipient has identified a number of specific sources and individuals that constitute the only messages the recipient is willing to accept at home. At physical address 9 (the recipient's answering service), the recipient has indicated that he is willing to receive and/or have forwarded all calls to this destination by default.

Next, the information profile (400) includes recipient specified target steering preferences (406). Continuing with the present example, such target steering information might appear as follows:

(Target steering)

Address 1: "Felix, Esq."; "Cat Enterprises"
Address 2: "Ignatz"; "9 Lives Insurance"*
Address 3:
Address 4:
Address 5: "Felix, Esq."; "Cat Enterprises"
Address 6: "Ignatz"; "9 Lives Insurance"*
Address 7:
Address 8: "Litterman"*
Address 9:

Accordingly, messages (and/or message descriptors) that include a particular recipient alias are directed to an appropriate recipient preferred corresponding destination. For example, messages intended for "Felix Esquire" or "Cat Enterprises" are particularly desired by this recipient for reception at either address 1 or address 5 (these being the recipient's office telephone and office facsimile machine, respectively). Messages directed, however, to "Ignatz" or "Nine Lives Insurance" are steered instead to either the recipient's home telephone or facsimile machine. It will further be noted that the alias "Nine Lives Insurance" as set forth for address 2 and address 6, and the alias "Litterman" as specified for address 8, have an asterisk associated therewith. The asterisk specifies an indicia of exclusivity. Accordingly, messages that specify "Nine Lives Insurance" can only be steered to either address 2 or 6. The recipient has indicated a particular sensitivity towards reception of such messages, and has accordingly indicated a refusal to receive such messages at any other destination.

Next, the information profile (400) includes context steering information (407). In the present example, such information might appear as follows:

(Context Steering)

Address 1:
Address 2:

Address 3:
Address 4:
Address 5:
Address 6: "Life insurance"; "Boat?"; "Yacht?"
Address 7:
Address 8: "Life insurance"; "Boat?"; "Yacht?"
Address 9:

The controller (104) will consider the information in the context header (310) of the message descriptor (300) (and/or, in an appropriate embodiment, the contextual information in the message (311) itself) to look for the expressions "Life Insurance", "Boat", or "Yacht." Should any of these expressions be found, then the controller (104) will take into account the recipient's expressed preference that messages pertaining to a certain context be directed to particular destinations. (In the example given, the word "Boat" and "Yacht" appear in conjunction with a question mark. As per a not untypical data base search methodology, this question mark constitutes a universal suffix indicator, thereby indicating that the words "Boat," "Boats," and "Boating" are all contextual words of interest.)

Next, the information profile (400) sets forth recipient defined priority preferences (408). In the present example, these entries might appear as follows:

(Priority)

Address 1:
Address 2: All if priority 1
Address 3: All if priority 2
Address 4:
Address 5:
Address 6:
Address 7:
Address 8:
Address 9:

Here, all messages, regardless of priority, that are otherwise directed to address 1 remain so directed. If a particular message specifies address 2, however, and that message source and/or sender is not otherwise allowed (as per, for example, the source steering or target steering preferences discussed above), then the messages will only be accepted at address 2 if they are of a high level of priority. Lower levels of priority will be redirected to other destinations notwithstanding initial designation of the recipient's residential telephone.

Next, the information profile (400) provides for time of day steering (409). In the present example, certain entries might appear as follows:

(Time of day)

Address 1: Forward to Address 3 between 5:15–6:30 pm weekdays
Address 2:
Address 3:
Address 4:
Address 5: Forward to Address 6 between 5:15 pm–6:00 am weekdays; all weekend
Address 6:
Address 7:
Address 8:
Address 9:

So provided, communications originally addressed or otherwise directed to address 1 (the recipient's office telephone) between 5:15 and 6:30 PM on a weekday will instead be forwarded to address 3, i.e., to the recipient's automobile telephone. Such a time of day preference would be appropriate to reflect a recipient's preference of receiving office calls at the conclusion of the business day in his automobile when he is commuting home from the office.

Lastly, in this embodiment, the information profile includes billing information (410). In the present example, certain entries might appear as follows:

Address 1: Use tariff, "ISDN 1"; bill to: "PDQ Corporation";
Address 2: Use tariff "res 1"; bill to: "Resident"
Address 3: Use tariff "cell 1"; bill to: "PDQ"
Address 4: Use tariff "pager 1"; bill to: "PDQ"
Address 5: Use tariff "fax 1"; bill to: "PDQ"
Address 6: Use tariff "fax res"; bill to: "PDQ"
Address 7: Use tariff "ISDN 2"; bill to: "PDQ"
Address 8: Use tariff "res 2"; bill to: "PDQ"
Address 9: Use tariff "ans 1"; bill to: "PDQ"

Figure 5:
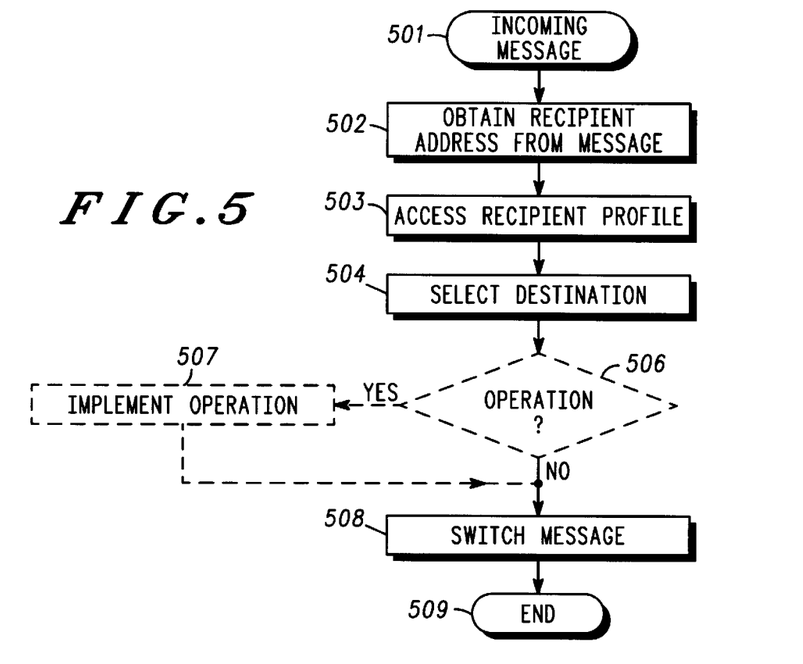
FIG. 5 comprises a flow diagram depicting overall message routing in accordance with the invention.

With the above description in mind, general processing of a message will now be described with reference to FIG. 5.

Upon receiving indicia of a need to transmit a message (501) (or, in a particular embodiment, presuming that sufficient buffer capacity exists, upon receiving a message intended for being forwarded to a final destination), the network obtains the recipient address from the message (502). In this embodiment, that recipient address is easily extracted from the message descriptor (300) as described above. Using this information, the network then interfaces with the controller (104) to access the information profile for the designated recipient (503). Based upon the information in the message descriptor, and further based upon the information in the information profile for the recipient, a particular destination is then selected (504).

As described earlier, in an alternative embodiment, the message may be subjected to one or more operations prior to directing that message to the selected destination. If such operations are required (506), those operations are implemented (507). The type(s) of operation accommodated can of course be widely varied to suit a particular intended application. For example, to suit the needs of one system, format translation information would be utilized at this point to translate a message from a first format (as originally dictated by the source) into a second format that is compatible with the selected destination. By way of another example, the message itself could include some executable code (such as an encryption algorithm), and this self-included code would be executed during this operations step (507) when appropriate. Continuing this particular example, the encryption algorithm would be utilized to encrypt the message prior to providing the message to the selected destination. Following implementation of any such operations, the network (101) then switches the message (508) to the selected destination, in accordance with prior art technique and the process concludes (509).

Figure 6:
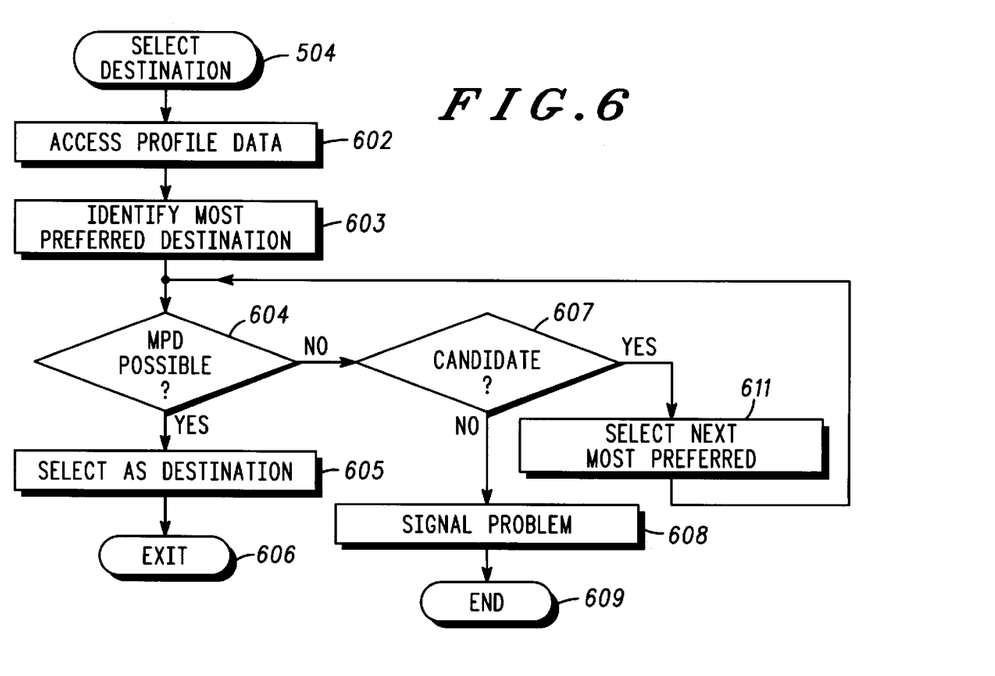
FIG. 6 comprises a flow diagram depicting destination selection in accordance with the invention.

The destination selection process itself will be more particularly described with reference to FIG. 6.

To select one or more particular destinations (504), the controller (104) accesses the profile data (602) and identifies a most preferred destination (603). For example, if the message includes context which the recipient has indicated a preference for receiving at a particular message destination, then that particular message destination will be identified as a most preferred destination, all other criteria being no more than equal. The controller (104) then determines whether that most preferred destination is possible (604). For example, the most preferred destination may be a facsimile address, whereas the message comprises textual information in a noncompatible form, which form cannot be made compatible given the capabilities of the controller and network. Presuming that the most preferred destination is physically possible, that destination is selected as the actual destination (605) and the process exits (606) to continue as described above in FIG. 5.

If the most preferred destination is not possible (604), the process determines whether any other candidate destinations exist (607). If no other destinations are potentially available, a problem signal is sourced (608) (such as emission of a trouble tone to the message source or other appropriate data message indicating that a problem exists in completing the message transaction) and the process concludes (609). If other candidates do exist (607) then the controller (104) selects a next most preferred destination (611) and the process repeats until either a particular destination is ultimately selected or no suitable destinations exist.

So configured, the above system functions to direct a message to a recipient influenced destination, which destination may, or may not, coincide with a destination as originally selected by the originator of the message.

With the above description in mind, that aspect of the embodiment that particularly supports mobility of a user to locales not otherwise permitting (or warranting) permanent inclusion in such an information profile, will now be described.

Figure 7:
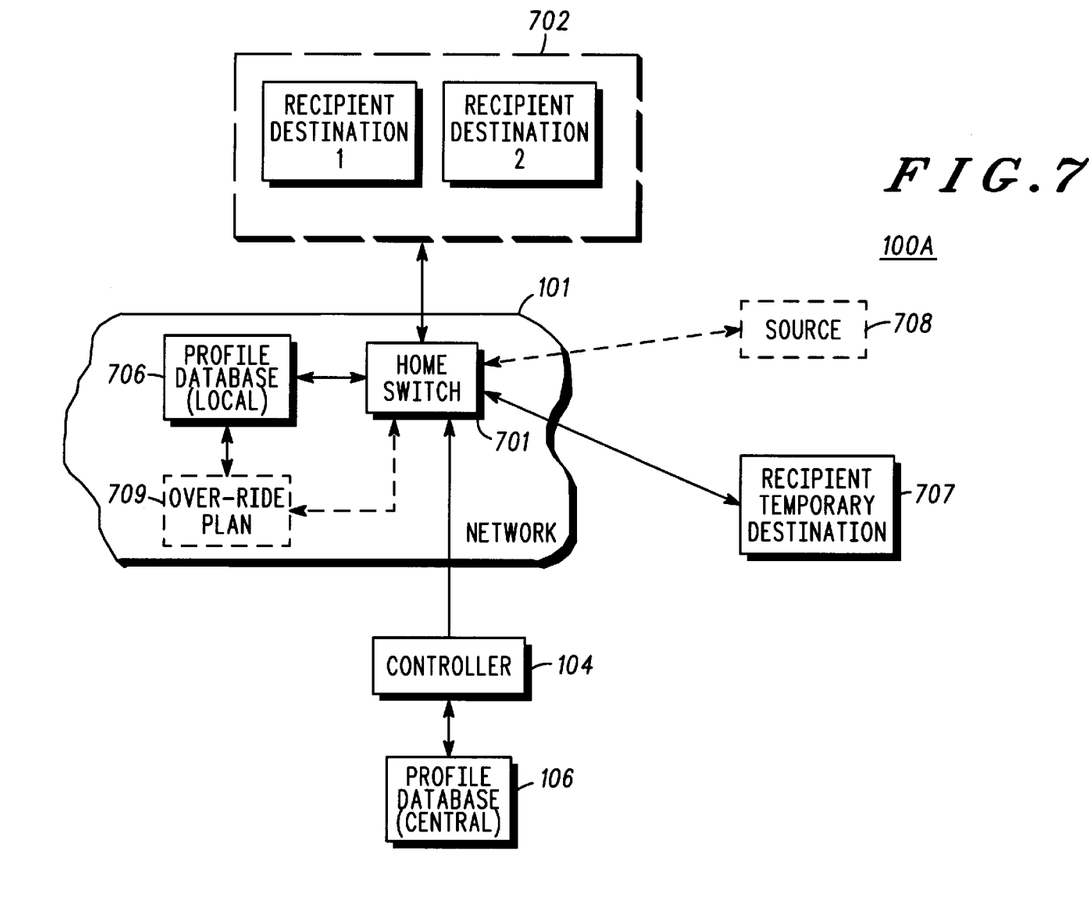
FIG. 7 comprises a block diagram depiction of a revised communication system in accordance with the invention.

Referring to FIG. 7, and as noted earlier, the network (101) will typically include a plurality of switches. For at least a given user, one of the switches will constitute a home switch (701). This home switch (701) will typically couple to and service at least some destinations (702) usually associated with that particular user (in this case, recipient destination 1 (703) and recipient destination 2 (704)). The controller (104), acting upon information in the profile data base (106) as described above, controls both the home switch (701) and other routing apparatus as described above to route messages from a user to a particular recipient destination.

Also depicted in FIG. 7 is a temporary destination for this particular recipient (107). This temporary destination constitutes a destination that is not present in the profile data base (106). This temporary destination (707) could be, for example, a telephone at a business colleague's office, a cellular telephone in a friend's vehicle, a facsimile machine at a hotel, and so forth.

Pursuant to this embodiment, the user can contact the system (100A) through an appropriate input source (708) such as a telephone, computer keyboard, or the like. This source (708) may be at the locale of the temporary destination, or could be located elsewhere, depending simply upon the needs of the user. Through this input mechanism, the user provides a temporary over-ride instruction, compelling a temporary destination preference to be included in his information profile. With this information available, a particular message can then be routed to the user at the recipient temporary destination (707) by subsequent use of the information profile in accordance with the above description.

Before describing the over-ride process in more detail, two alternative embodiments relevant to that description will be set forth. In the first embodiment, in addition to the profile data base (106) described above, which profile data base (106) couples to the controller (104), a local profile data base (706) is maintained and coupled to the home switch (701). Pursuant to this embodiment, temporary over-ride instructions are directed to the local profile data base (706) via the home switch (701). Thereafter, temporary destination preferences as implemented through the temporary over-ride instruction are communicated for entry into the central profile data base (106) and subsequent use by the controller (104). Depending upon system configuration, size, and many other operating parameters, the use of such a local data base, in combination with a central data base, may better accommodate the operating characteristics and needs of the overall system.

In the second embodiment, an over-ride plan (709) can be stored in conjunction with the profile data base (in the embodiment depicted, the over-ride plan (709) is stored in conjunction with the local profile data base (706); if desired, this over-ride plan (709) could be alternatively stored in conjunction with the central profile data base (106)).

The over-ride plan (709) includes one or more pre-entered temporary over-ride preference elements. Each such temporary element, or predetermined set of such elements, is identified by a relatively simple code. For example, an individual about to begin a business trip would often know his or her itinerary. Consequently, address information for various hotels, including voice and data links, could be pre-entered into the over-ride plan (709). Upon arriving at a given hotel, the user, using the source (708) of his or her choice (such as a room telephone), could provide a simple code (such as a short prearranged series of DTMF tones) to the home switch (701), which prearranged series would be interpreted as a temporary over-ride instruction that would cause the corresponding prearranged destination preferences to be used in accordance with the method to be described below.

Figure 8:
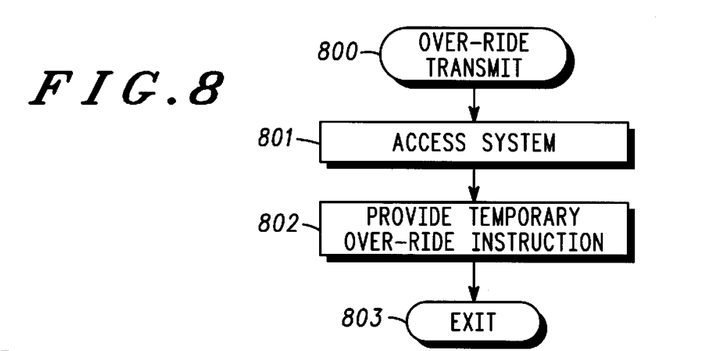
FIG. 8 comprises a flow diagram depicting transmission of temporary over-ride instructions.

Referring now to FIG. 8, transmission of temporary over-ride information (800) will be described.

Upon determining a need to arrange for temporary destination preferences, the user accesses the system (801) as described above, and provides one or more temporary over-ride instructions (802). The over-ride process then concludes from the user's standpoint (803). These instructions can be DTMF signals that include relevant action information, such as temporary destination addresses, commencement times, expiration times, and the identification of those particular preference elements in the user's profile that are to be temporarily over-riden. In the alternative, as noted above, if the above information has been pre-entered as a plan, the user would only need to enter a corresponding code that called up and utilized the prearranged temporary information.

Figure 9:
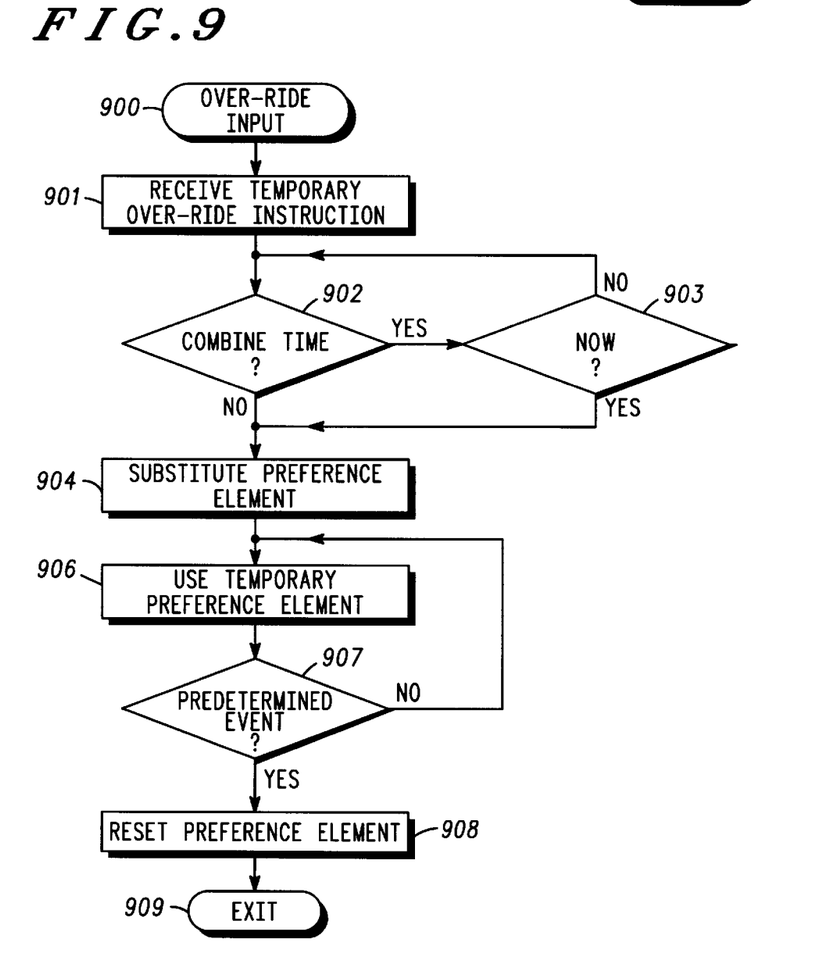
FIG. 9 comprises a flow diagram depicting use of the temporary over-ride instructions.

System use of such over-ride instructions will now be described with reference to FIG. 9.

Upon receiving temporary over-ride instructions (901) from the user as described above, the process determines whether a commencement time has been associated with the instruction (902). If so, the process determines whether the commencement time has yet occurred (903). If not, the process waits for the commencement time to occur.

Presuming either that no specific commencement time has been identified, or that the commencement time has occurred, the process causes one or more preference elements in the information profile of the user to be substituted by temporary preference elements (904), all as specifically identified by the user. These temporary preference elements are then used (906) as appropriate to make subsequent destination selections for the corresponding user.

When a predetermined event occurs (907), the process resets the preference element (908), thereby causing the temporary elements to be removed and the original elements to be reinstated for subsequent use.

As noted above, the predetermined event (907) can comprise any of a variety of events, including occurrence of the prearranged expiration time, and/or reception of a specific reset instruction from the user.

Following the above, the process concludes (909).

So configured, a user has great flexibility with respect to directing messages from various sources and of various types to various appropriate destinations. Of particular importance, the user can also temporarily alter those user preferences to accommodate directing messages to temporary destinations in accordance with the users needs and wishes.

What is claimed is:

1. A method for use with a communication system, which communication system includes an information profile for at least one user, which information profile includes at least some user preferences regarding a plurality of different user destinations for the user, such that the communication system will automatically select a destination from amongst a plurality of candidate destinations for a message intended for the user as a function, at least in part, of the information profile, the method comprising the steps of:

A) accessing the communication system via a communication link using a communication device;
   B) transmitting from the communication device via the communication link a temporary over-ride instruction to the communication system to temporarily over-ride at least one element in the information profile while retaining the at least one element from the communication system, such that the temporary over-ride instruction can later be automatically replaced by the at least one element.

2. The method of claim 1, wherein the step of transmitting from the communication device via the communication link to the communication system a temporary over-ride instruction to temporarily over-ride at least one element in the information profile includes the step of also providing to the communication system an expiration time related to the temporary over-ride instruction.

3. The method of claim 1, wherein the step of transmitting from the communication device via the communication link to the communication system a temporary over-ride instruction to temporarily over-ride at least one element in the information profile includes the step of also providing to the communication system a commencement time related to the temporary over-ride instruction.

4. The method of claim 1, wherein the temporary over-ride instruction comprises an instruction to implement a particular previously stored temporary over-ride plan.

5. The method of claim 4, wherein the previously stored temporary over-ride plan is stored by the communication system in combination with the information profile.

6. The method of claim 1, wherein the temporary over-ride instruction comprises an instruction to temporarily substitute, for a first destination contained in the information profile, a second destination identified by the temporary over-ride instruction.

7. The method of claim 6, wherein the step of transmitting from the communication device via the communication link to the communication system a temporary over-ride instruction to temporarily over-ride at least one element in the information profile includes the step of also providing to the communication system a commencement time related to the temporary over-ride instruction, such that the second destination will be automatically substituted for the first destination upon occurrence of the commencement time.

8. The method of claim 7, wherein the step of transmitting from the communication device via the communication link to the communication system a temporary over-ride instruction to temporarily over-ride at least one element in the information profile further includes the step of also providing to the communication system an expiration time related to the temporary over-ride instruction, such that substitution of the second destination for the first destination will be automatically discontinued upon occurrence of the expiration time.

9. The method of claim 1, and further including the step of:

C) providing a reset instruction to the communication system to reset the information profile and to remove the temporary over-ride.

10. A method for use with a communication system, which communication system includes an information profile for at least one user, which information profile includes at least some user preferences regarding a plurality of different user destinations, such that the communication system will automatically select a destination from amongst a plurality of candidate destinations for a message intended for the user as a function, at least in part, of the information profile, the method comprising the steps of:

A) receiving a temporary over-ride instruction relating to the information profile;
   B) in response to receiving the temporary over-ride instruction, temporarily replacing at least one element in the information profile with at least one temporary element;
   C) using thereafter the at least one temporary element in place of the at least one element when selecting at least some destinations for messages intended for the user;
   D) upon occurrence of a predetermined event, automatically replacing the at least one temporary element with the at least one element.

11. The method of claim 10, and further including the step of:

E) thereafter, using the at least one element when selecting at least some destinations for messages intended for the user.

12. The method of claim 10, wherein the step of temporarily replacing the at least one element with at least one temporary element includes the step of retaining the at least one element, such that the at least one element will be available when the predetermined event occurs.

13. The method of claim 10, wherein the temporary over-ride instruction includes a commencement time, and wherein step B includes the step of:

B1) when the commencement time occurs, temporarily replacing the at least one element in the information profile with the at least one temporary element.

14. The method of claim 13, wherein the temporary over-ride instruction includes an expiration time, and wherein the predetermined event includes occurrence of the expiration time.

15. The method of claim 10, wherein the temporary over-ride instruction includes an expiration time, and wherein the predetermined event includes occurrence of the expiration time.

16. The method of claim 10, wherein the predetermined event includes reception of a reset instruction that instructs the communication system to reset the information profile with respect at least to the temporary over-ride instruction.

17. The method of claim 10, wherein the communication system maintains a temporary over-ride plan containing at least one temporary over-ride element, and wherein:

the temporary over-ride instruction relating to the information profile as received in step A includes an identification of at least one temporary over-ride element as contained in the temporary over-ride plan;
   in response to receiving the temporary over-ride instruction, temporarily replacing at least one element in the information profile with at least one temporary element as identified in the temporary over-ride instruction and as obtained from the temporary over-ride plan.

18. A method for use with a communication system, which communication system includes an information profile for at least one user, which information profile includes at least some user preferences regarding a plurality of different user destinations, such that the communication system will automatically select a destination from amongst a plurality of candidate destinations for a message intended for the user as a function, at least in part, of the information profile, the method comprising the steps of:

at a remote site:
   A) accessing the communication system;
   B) providing a temporary over-ride instruction to the communication system to temporarily over-ride at least one element in the information profile;

at a destination determining site:
   C) receiving the temporary over-ride instruction;
   D) in response to receiving the temporary over-ride instruction, temporarily replacing at least one element in the information profile with at least one temporary element;
   E) using thereafter the at least one temporary element in place of the at least one element when selecting at least some destinations for messages intended for the user;
   F) upon occurrence of a predetermined event, automatically replacing the at least one temporary element with the at least one element.

19. The method of claim 18, wherein:

A) the step of instructing the communication system to temporarily over-ride at least one element in the information profile includes the step of also providing to the communication system a commencement time related to the temporary over-ride instruction; and B) wherein step D includes the step of:
   D1) when the commencement time occurs, temporarily replacing the at least one element in the information profile with the at least one temporary elements.

20. The method of claim 18, wherein:

A) the step of instructing the communication system to temporarily over-ride at least one element in the information profile includes the step of also providing to the communication system an expiration time related to the temporary over-ride instruction;

B) wherein the predetermined event includes occurrence of the expiration time.

* * * * *